Aug. 8, 1933.  L. T. FREDERICK  1,921,516
METHOD OF MAKING TUBES
Filed June 20, 1930   2 Sheets-Sheet 1
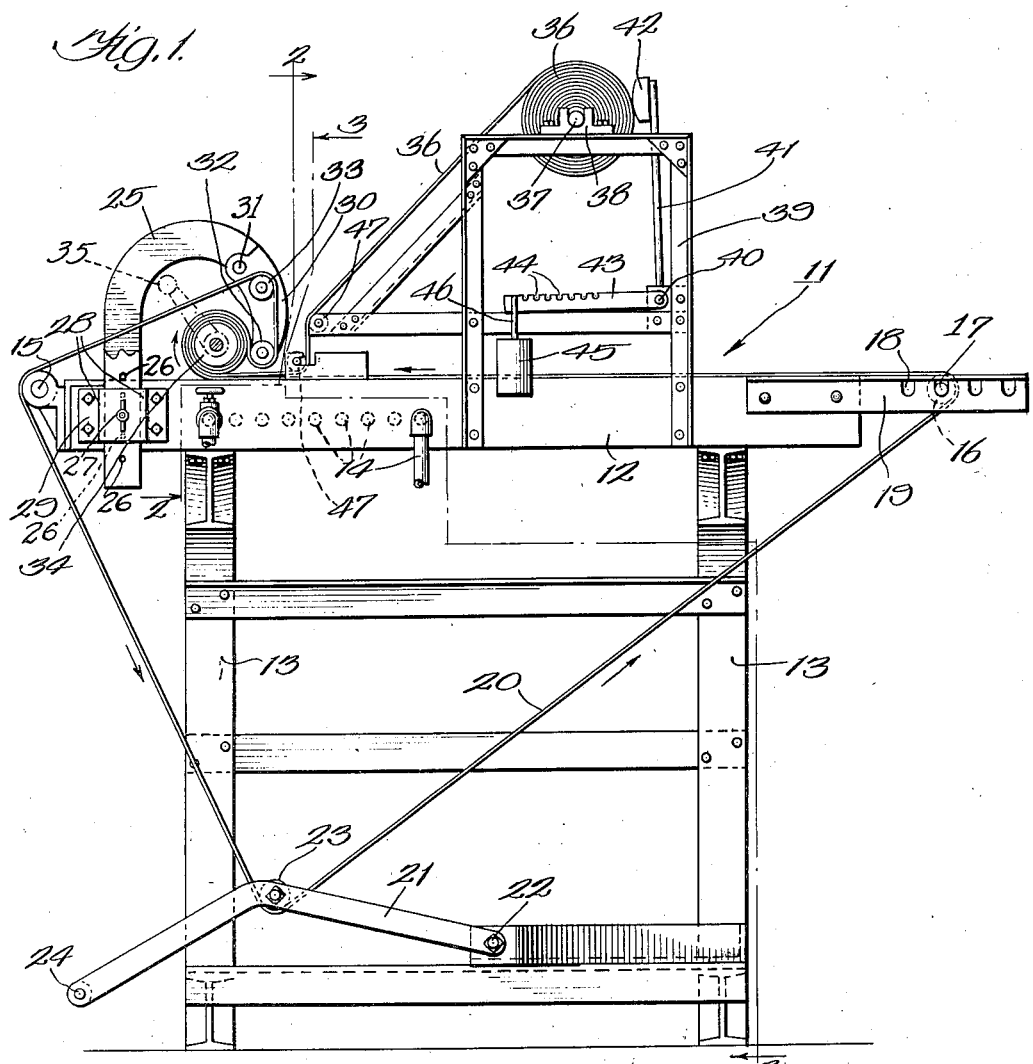
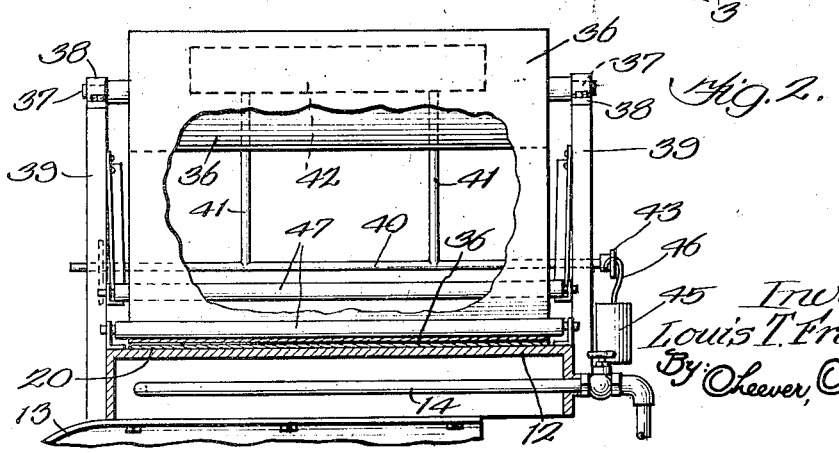
Inventor.
Louis T. Frederick
By Cheever, Cox & Moore
Attys.

Aug. 8, 1933.   L. T. FREDERICK   1,921,516
METHOD OF MAKING TUBES
Filed June 20, 1930   2 Sheets-Sheet 2
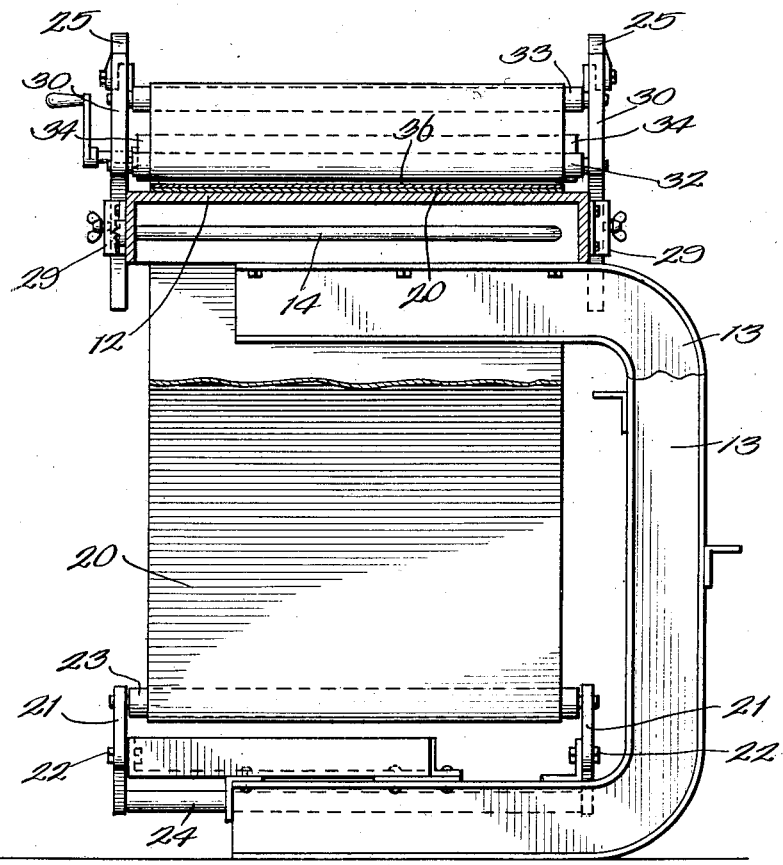
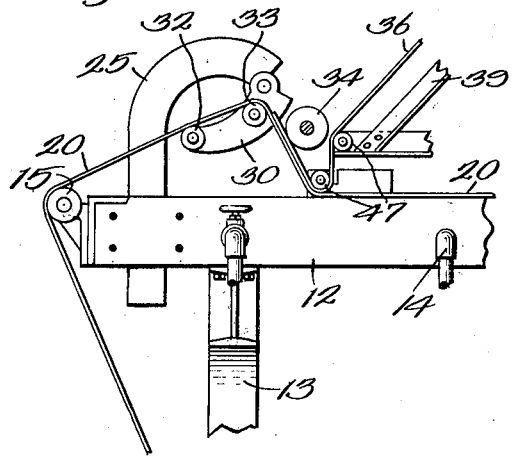
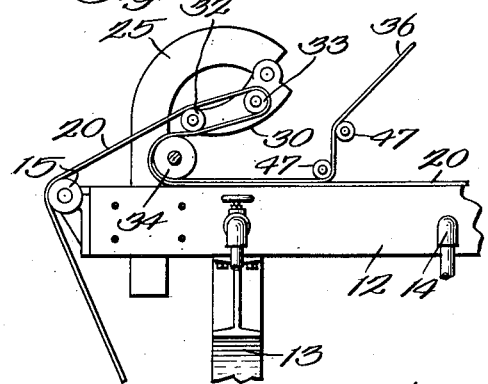
Inventor:
Louis T. Frederick
By Leever, Cox & Moore Atty.

Patented Aug. 8, 1933

1,921,516

UNITED STATES PATENT OFFICE 1,921,516

METHOD OF MAKING TUBES

Louis T. Frederick, Valparaiso, Ind., assignor to Continental Diamond Fibre Company, Newark, Del., a Corporation of Delaware Application June 20, 1930. Serial No. 462,556

8 Claims. (Cl. 93—94)

My invention relates to tube making and has for an important object the provision of a novel method of making tubes by winding sheets of material upon a mandrel while simultaneously applying heat and pressure to consolidate the material on the mandrel.

My invention contemplates also the provision of apparatus for accomplishing this purpose.

The object of my invention is to produce tubes from sheet material more rapidly and with less effort than heretofore and without sacrificing the quality of the product. In fact my method of making tubes results in a product of superior characteristics resulting in part from increased density produced by winding sheets into tubes under pressure and the resulting tubes made by my method are more uniform in texture throughout the product, being free from pockets and other defects appearing in tubes made heretofore by more antiquated methods.

These and other objects of the invention will become apparent as my invention is more fully understood from the following description, which taken with the accompanying drawings discloses a preferred form of tube making apparatus embodying my invention.

Referring to the drawings:

Figure 1 is a side view of apparatus embodying my invention;

Figure 2 is a vertical cross section taken substantially along the line 2—2 in Figure 1;

Figure 3 is a vertical cross section taken substantially along the line 3—3 in Figure 1; and Figures 4 and 5 are fragmentary views illustrating a part of the apparatus shown in Fig. 1, in order to demonstrate its operation.

Although my invention contemplates the use of any sheet material, which is capable of being wound up to form tubes, it is particularly applicable to the manufacture of tubes from fabric sheets impregnated with heat curable material, such as the reaction product of phenol and formaldehyde, in its unreacted state and my method consists in winding sheets of this type upon a mandrel, which may be heated, if desired, while applying pressure radially inwardly as the sheets are wound upon the mandrel.

This may be accomplished by the illustrated apparatus which comprises a main frame 11 having a portion forming a work table 12 and other parts forming support members 13 for the work table. The work table may be formed of iron or other suitable material and is or may be provided with any suitable heating means, such for instance as the steam coils 14 connected by suitable feed and exhaust pipes, including control valves, with a source of steam.

At its head end, the table 10 is provided with a stationary roller 15, which extends the width of the table adjacent its edge, and a similar roller 16 is provided at the foot of the table, the roller 16 being shiftably mounted with respect to the table, being for this purpose provided with axles 17 at its opposite ends, which axles may be arranged in any pair of notches 18 formed in support bars 19 which are secured to the sides of the table with their notching portions extending rearwardly as illustrated.

An endless belt 20 of heavy canvas or other suitable material is arranged to pass around the rolls 15 and 16 and to extend across and be supported in part by the table top. This is clearly illustrated in Figure 1 of the drawings. In the lower portions of the main frame 11 a sub-frame is arranged. The sub-frame comprises a pair of bars 21 pivoted at their rear ends 22 in the main frame near the lower end of the rear support member 13. Intermediate their ends these pivoted members 21 are bent downwardly and forwardly and support the opposite ends of a roller 23 which, in reality, is a tensioning roller for the belt. The bend in the arms is entirely optional and is for the purpose of arranging their forward ends in a suitable relative position with respect to the frame, in order that the treadle bar 24, which is mounted between the forward ends of the bars 21, will be arranged in convenient position to receive the foot of the machine operator.

At or near the head end of the table I provide, one on either side of the table, a pair of support members 25, the shanks of which are provided with perforations 26, in order to permit same to be secured to the table in various vertically adjusted positions by means of the thumb nuts 27, the support members being arranged between the spaced ridges 28 of a guide plate 29 and being clampable in position therein by means of the thumb nut 27. Of course I may employ any suitable means for adjustably securing the support members to the table. The support members 25 have their upper portions arched, in order to extend rearwardly of the table and a "toggle arm" 30 is pivoted as at 31 to the end of each of the support members 35. A roller 32 is mounted between the lower ends of the "toggle arms" 30 and a similar roller 33 is arranged parallel to roller 32, and is supported by and between the "toggle arms" at points near the fulcra thereof.

A winding mandrel 34 is provided. This mandrel is not connected to the table, but comprises a cylindrical roller, which is supported upon the table top above the belt. The belt also passes above the rollers 32 and 33, as shown in Figure 4 of the drawings, and the mandrel may be moved forwardly under the toggle arm carrying with it a bight of the belt, as shown in Figure 5. After the belt is now tensioned as by the operator pressing upon the treadle 24, the mandrel being retained in its forward position, the toggle will move rearwardly until the lower roller 32 engages behind the mandrel. The mandrel may then be released and further tensioning of the belt, as by increasing the downward pressure on the treadle 24, will result in the mandrel and the toggle arm assuming the position illustrated in Figure 1 of the drawings, in which the belt forms a bight around the mandrel in front of the lower roller 32 of the toggle arm. If still greater pressure is now applied on the treadle 24, the mandrel will be tightly squeezed within the bight of the belt. I provide means for rotating the mandrel when it is in squeezing position. This may be any suitable means, such as the crank 35 illustrated, or I may provide power apparatus which may be connected with the mandrel through a universal joint or otherwise in order to rotate same. If the mandrel is rotated when squeezed within the bight of the belt in a direction to cause the belt 20 to travel in the direction illustrated by the arrows in Figure 1 of the drawings and sheet material is fed between the mandrel and belt, it will be wrapped upon the mandrel in the form of a tube.

It will be clearly apparent that such wrapping will be accomplished under radial pressure, since the belt 20 is being tightly squeezed inwardly upon the mandrel. This inward squeezing is proportional to the downward force exerted upon the treadle 24. By winding up said material into tubes upon the device just described, that is to say, by winding the material into tubes, while exerting radial pressure upon the material after it is wound into the tube, I am able to produce tubes of superior quality, that is to say, the tubes are more solid and more uniform in texture. They are characterized by an absence of air pockets and other defects. I find that the apparatus is particularly advantageous for use in the manufacture of composite tubes made of so-called thermo-plastic or heat hardening material, a common essential of which is the synthethic resin re-action product of phenol and formaldehyde.

Composite tubes embodying a heat hardening synthetic resin may be formed from fibrous sheet material, which has been previously suitably impregnated with the heat hardening resin of a roll and in making tubes on the apparatus described above, the impregnated fabric is first arranged in the form of a roll 36 mounted on a mandrel 37, the ends of which are suitably journaled in bearings 38, which in turn are carried in a super-structure 39 suitably mounted in the main frame 11. The super-structure is or may be formed of angle irons bolted together as shown in Figures 1 and 2 of the drawings.

The super-structure includes a brake for checking the unrolling movement of the impregnated fabric, in order that the same may be under a slight tension when fed onto the winding mandrel 34. This brake comprises a shaft 40 suitably pivoted in its opposite end in the super-structure 39. The shaft 40 carries a pair of spaced apart upstanding arms 41, which carry an elongated brake pad or shoe at their upper ends in position to press against the surface of the roll 36. The shaft 40 also carries at one end a forwardly extending arm 43, which is provided with notches 44 in its upper edge, and a weight 45, provided with a suitable hook 46, may be attached to the arm 43 at any one of the notches 44, whereby to regulate the pressure with which the pad 42 engages the roll 36. The super-structure 39 also carries guide rollers 47 around which the impregnated strip from the roll 36 may pass in travelling to the winding roller.

By means of the above described apparatus, the impregnated fabric will be fed under slight tension which may be regulated by shifting the weight 45 along the arm 43, between the mandrel 34 and the enfolding bight of the belt 20 and upon rotation of the mandrel, the fabric will be wound thereon, while being simultaneously subjected to radial pressure. The table also is provided with heating means so that the heat curable resin with which the fabric is impregnated will be cured and compacted to final form as the tube is being made.

It is thought that the invention and numerous of its attendant advantages will be apparent from the foregoing description and it is obvious that numerous changes may be made in the form, construction and arrangement of the several parts without departing from the spirit and scope of my invention or sacrificing any of its attendant advantages. The form hereinbefore described being a preferred embodiment for the purpose of illustrating my invention.

Having thus described my invention, what I claim as new and desire to secure by Letters Patent is:

1. The method of making composite tubes, which comprises winding up sheet material to substantially tubular form, as on a mandrel, while maintaining the sheet material in tension and exerting pressure radially upon the wound portions of the sheet material at substantially all points in the circumference thereof.

2. The method of making composite tubes, which comprises winding up heat curable sheet material associated with a binder to substantially tubular form, as on a mandrel, in the presence of heat, while exerting pressure radially upon the wound portions of the sheet material at substantially all points in the circumference thereof.

3. The method of making composite tubes, which comprises winding up sheet material associated with a binder to substantially tubular form, as on a mandrel, under tension, while exerting pressure radially upon the wound portions of the sheet material at substantially all points in the circumference thereof.

4. The method of making composite tubes, which comprises winding up heat curable sheet material associated with a binder to substantially tubular form, as on a mandrel, under tension and in the presence of heat, while exerting pressure radially upon the wound portions of the sheet material at substantially all points in the circumference thereof.

5. The method of making composite tubes which comprises feeding a strip of fabric impregnated with heat convertible resin to a roller while maintaining the strip in tension and in winding the tensioned strip upon the roller while exerting radial compression inwardly upon the wound portion of the strip at substantially all points in the circumference of the tube being rolled.

6. The method of making composite tubes which comprises feeding a strip of fabric impregnated with heat convertible resin to a roller while maintaining the strip in tension and in winding the tensioned strip upon the roller while exerting radial compression inwardly upon the wound portion of the strip at substantially all points in the circumference of the tube being rolled, and subjecting the sheet material to the action of heat as it is rolled to tubular form in order to cure the resin.

7. The method of making tubes, which consists in winding a flexible sheet, containing a binder, to substantially tubular form as on a mandrel or roller, the while maintaining the sheet in tension and simultaneously applying pressure radially inwardly upon the portions of the sheet wound upon the mandrel at substantially all points in the circumference thereof.

8. The method of making tubes, which consists in winding a flexible fabric sheet, containing a heat curable binder, to substantially tubular form, as on a mandrel or roller, while maintaining the sheet under appreciable tension, heating the fabric sheet and applying pressure radially inwardly upon the portion of the sheet wound about the mandrel substantially at all points in the circumference thereof.

LOUIS T. FREDERICK.